United States Patent [19]

Jordan et al.

[11] Patent Number: 5,468,180
[45] Date of Patent: Nov. 21, 1995

[54] APPARATUS FOR REMOVING THE SKIN FROM THE BODIES OF SLAUGHTERED POULTRY

[75] Inventors: Holger Jordan, New Bedford, Mass.; Sigurd Richartz, Lübeck, Germany

[73] Assignee: Nordischer Maschinenbau Rud. Baader GmbH & Co KG, Lubeck, Germany

[21] Appl. No.: 356,574

[22] Filed: Dec. 15, 1994

[30] Foreign Application Priority Data

Dec. 17, 1993 [EP] European Pat. Off. ............ 93120351

[51] Int. Cl.$^6$ ...................................................... A22B 5/16
[52] U.S. Cl. .................................................... 452/127
[58] Field of Search ................................. 452/127, 125

[56] References Cited

U.S. PATENT DOCUMENTS

| 3,324,915 | 6/1967 | Townsend | 452/125 |
|---|---|---|---|
| 3,685,561 | 8/1972 | Beasley | 146/130 |
| 3,733,997 | 5/1973 | Beasley | 452/127 |
| 4,203,179 | 5/1980 | Braeger | 452/125 |
| 4,340,995 | 7/1982 | Braeger | 452/127 |
| 4,920,875 | 5/1990 | Schill | 452/127 |
| 5,399,118 | 3/1995 | Long et al. | 452/127 |

FOREIGN PATENT DOCUMENTS

| 823047 | 1/1938 | France . |
| 2057654 | 5/1971 | France . |
| 8901368 | 12/1990 | Netherlands . |

Primary Examiner—Willis Little
Attorney, Agent, or Firm—Fay, Sharpe, Beall Fagan, Minnich & McKee

[57] ABSTRACT

An apparatus for removing skin from the bodies of body parts of slaughtered poultry is described. The apparatus comprises a skin entraining means (2) having a non-skid or "gripping" outer surface (13) and a pressing means (4) with a knife (3), which is arranged spaced from the outer surface (13) by a gap. An auxiliary conveying means is located above the knife (3) which consists of at least one rotary member (19, 20) driven in the opposite sense to the skin entraining means (2) and has a protruding helical web (21, 22) around its circumference.

27 Claims, 1 Drawing Sheet

5,468,180

APPARATUS FOR REMOVING THE SKIN FROM THE BODIES OF SLAUGHTERED POULTRY

BACKGROUND OF THE INVENTION

1. Field of the Invention

The invention concerns an apparatus for removing the skin from the bodies or body parts of slaughtered poultry, having a rotationally driven skin entraining roller with a non-skid or gripping outer surface, a plane knife which lies with its cutting edge opposed to the roller outer surface and spaced from the same by a gap, a pressing shoe arranged downstream of the cutting edge in the :rotation direction of the skin entraining roller and having a pressing surface facing the roller outer surface and forming a gap therewith, and an auxiliary conveyor arranged in the region above the knife and resiliently displaceable away from said knife under spring force or gravity.

2. Prior Art

A changing attitude to taste and health have lead to more and more poultry, particularly chicken, being consumed, of which products without skin are particularly in demand. On the other hand, the interest in utilizing the skin as a highly valuable source of protein for human consumption is also growing, whereby the possibilities for utilization are most comprehensive when the skin can be gained from the individual body parts, e.g. the extremities, while retaining its natural structure.

Apparatus having the structural features mentioned above are widely spread and are used in practice for skinning fish and for removing rind from pork. However, in the known embodiment, these machines are not suitable for removing skin from poultry, or rather the result with respect to both the quality of the skinned meat portion as well as the obtained skin is not satisfactory.

OBJECTS OF THE INVENTION

It is thus the object of the invention to modify the skinning apparatus arranged according to the concept described, such that it is suitable for the removal of skin from poultry bodies or parts of said bodies.

A further object of the invention is to provide a poultry skinning apparatus which call produce skin in a state which allows it to be processed into valuable food products.

A still further important object of the invention is to provide a poultry skinning apparatus which produces skinned meat which remains essentially undamaged by the skinning process.

SUMMARY OF THE INVENTION

These and further objects off the invention are achieved in an apparatus for removing the skin from the bodies or body parts of slaughtered poultry, having a rotationally driven skin entraining roller with a non-skid or gripping outer surface, a plane knife which lies with its cutting edge opposed to the roller outer surface and spaced from the same by a gap, a pressing shoe arranged downstream of the cutting edge in the rotation direction of the skin entraining roller and having a pressing surface facing the roller outer surface and forming a gap therewith, and an auxiliary conveyor arranged in the region above the knife and resiliently displaceable away from said knife under spring force or gravity, wherein the auxiliary conveyor comprises at least one rotationally driven rotary member having an axis of rotation running essentially parallel to the axis of the skin entraining roller and a helical web around its circumference.

The advantages attainable with this apparatus consist in particular in that the poultry body or body parts to be skinned are, upon being engaged by the rotary member, subjected to a transverse movement or conveying with respect to the supply direction. This has the effect that the parts to be skinned are presented to the knife in a constantly changing position so that, on the one hand, the skin is securely seized and swiftly removed and, on the other hand, the danger of damaging the meat outer surface is considerably reduced.

Advantageous features according to the invention are contained in the dependent claims.

BRIEF DESCRIPTION OF THE DRAWINGS

Other objects and advantages of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
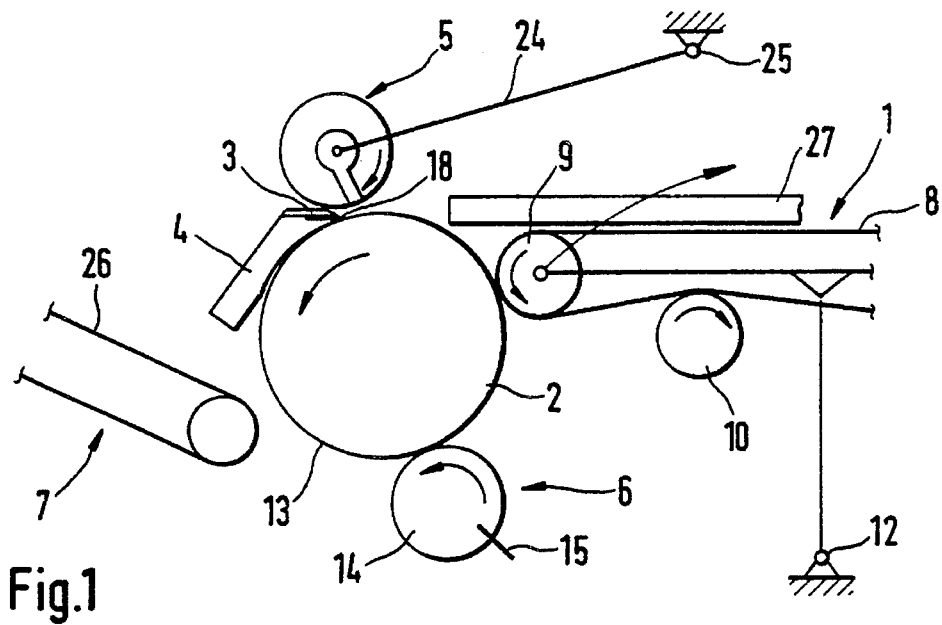
FIG. 1 shows a schematic representation of the side view of the skinning apparatus modified according to the invention.

The illustrated skinning apparatus is contained in a non-represented frame and essentially comprises a feed device 1, a skin entraining roller 2, a knife 3, a pressing shoe 4 arranged below the knife 3, an auxiliary conveyor 5 installed above the knife 3, a skin stripper 6 operating in combination with the skin entraining roller 2 and a removal device 7 for the skinned poultry parts.

The feed device 1 preferably includes an endless conveyor belt 8 which is guided around at least two deflection rollers, of which only the deflection roller 9 situated near the apparatus is shown. The conveyor belt 8 is driven by means of a driving roller 10, which is fixed with respect to the frame and positively engages with the lower run of the conveyor belt 8 in corresponding perforations 11 provided in the conveyor belt 8, for example. Guide rails 27 are associated with the upper conveying surface of the conveyor belt and are arranged in pairs which lead towards the two outer regions of the skin entraining roller 2, respectively. The guide rails 27 are adjustable in the longitudinal or feed direction and in each pair the guide rails are also adjustable with respect to their mutual spacing.

The feed device 1 is preferably disposed in a frame proper to itself which, for the purpose of cleaning, can be pivoted clockwise about an axis 12 such that the conveyor belt comes out of engagement with the driving roller 10.

The skin entraining roller 2 is located directly adjacent the deflection roller 9. It is equipped with a non-skid or gripping outer surface 13 and driven to rotate anticlockwise in an appropriate manner. A brush roller 14 arranged at the lower part of the skin entraining roller 2 and rotating in the same sense as the latter is in contact with the outer surface 13 and operates together with a scraping comb 15 which extends into the brush roller 14.

The pressing shoe 4 is located on the opposite side of the skin entraining roller from the feed device 1. It is provided with a pressing surface 16 which is directed towards the outer surface 13, extends along the same and is separated therefrom by a gap 17. The width of the gap 17 may be adjusted in an appropriate manner. The pressing shoe 4 also carries the knife 3, which is formed blade-shaped and attached in an appropriate manner to the pressing shoe 4 with the exposed cutting edge 18 directed against the supply direction. The cutting edge 18 of the knife 3 furthermore runs parallel to the outer surface 13 of the skin entraining roller 2 and forms a gap therewith which may be adjusted in an appropriate manner.

Figure 2:
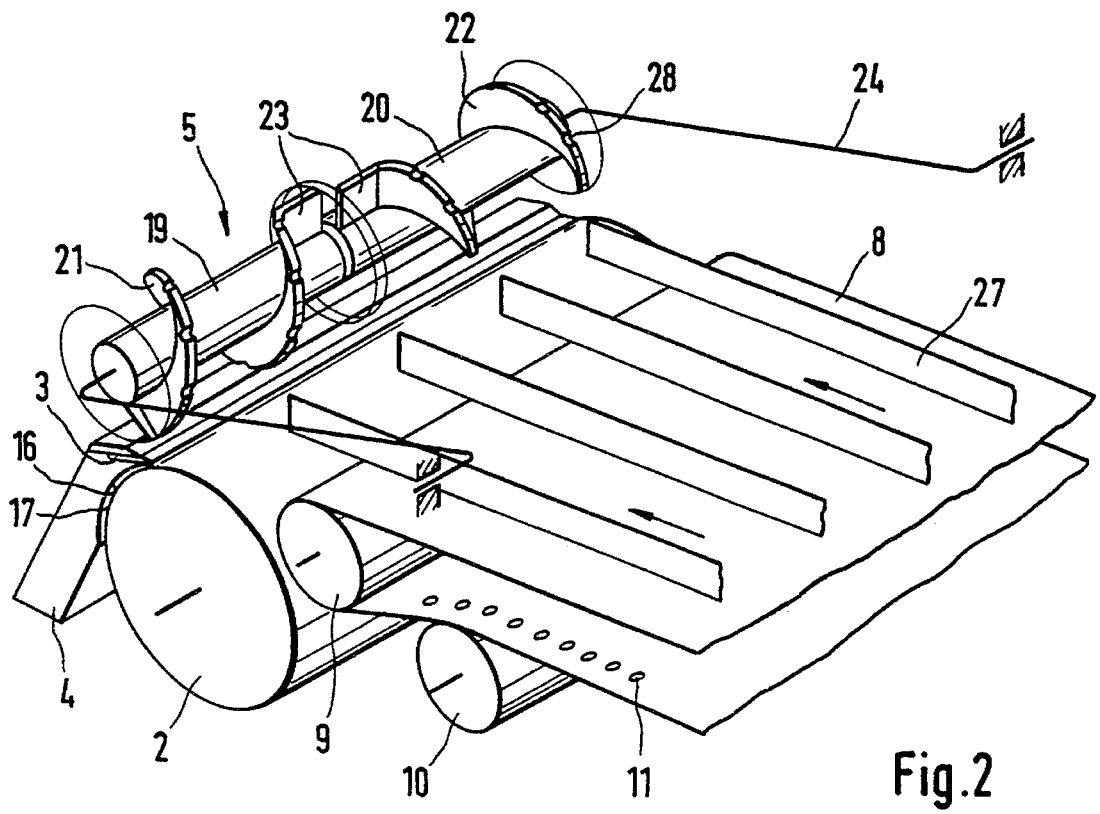
FIG. 2 shows a partial perspective view of the apparatus according to FIG. 1 in simplified representation.

In the embodiment, the auxiliary conveyor 5 arranged above the knife 3 comprises two rotary members 19 and 20 driven to rotate clockwise, each of which extends over about half the length of the skin entraining roller 2 and is provided with a helical web 21, 22 around the circumference. The webs have a thread direction which generates a component of force on the goods to be conveyed in a direction towards the central region of the skin entraining roller 2. The outer envelope formed by the webs 21, 22 of the rotating rotary members 19 and 20 may be cylindrical, as shown in FIG. 2 or take the form of a truncated cone. The webs 21 and 22 terminate in the region of their discharge ends with a web portion 23, which extends radially away from the axis of the respective rotary member and parallel thereto. The rotary members 19 and 20 are each guided or controlled by a guide rod 24, which can be pivoted about a frame-fixed bearing 25 between two non-represented stop members to adjust the spacing between the rotary members 19 and 20 and the outer surface 13 of the skin entraining roller 2.

The removal device 7 comprises an endless conveyor belt 26, which is arranged beneath the pressing shoe 4.

The poultry parts to be skinned are placed with their sides predominantly covered in skin on the conveyor belt 8 between guide rails 27, which guide the poultry parts towards the two outer regions of the skin entraining roller 2, respectively. The poultry parts thus come into contact with the "gripping" outer surface 13 of the skin entraining roller 2 and are advanced by this into the region of the cutting edge 18 of the knife 3 and simultaneously into the active region of the auxiliary conveyor 5. At this point, the product to be skinned is taken hold of by the latter's rotary members 19 and 20, the webs 21 and 22 of which cause a transverse conveying superimposed by a certain rolling motion. In this way, a loose end of skin quickly forms which is taken up in the gap 17 between the pressing surface 16 and outer surface 13 so that the skinning process commences spontaneously and is effectively assisted/supported by the continuous displacement of the product to be skinned.

To ensure that the product to be skinned is securely meshed by the rotary members 19 and 20, it is preferred that the helical webs have a pitch which is smaller than the larges width dimension of the body or body parts to be skinned and/or that the webs protrude above the rotary body to a height which is greater than the larges height dimension of the body or body parts.

The product to be skinned finally reaches the discharge ends of the respective rotary members 19 or 20 and is taken up by the web portions 23 and thrown out, whereby the remaining skin, fibres or the like are torn away from the product to be skinned and the stressing contact with the skin entraining roller 2 is thus rapidly terminated.

Whilst the skinned product passes over the back of the knife onto the conveyor belt 26 and is transported away, the skin passes through the gap 17 between the pressing surface 16 and outer surface 13 and adheres in general to the latter. The skin thus finally reaches the operative region of the brush roller 14, with which it is lifted off the roller outer surface 13. In order to prevent the skin from adhering to the brush roller 14 as well, the stripping comb 15 is provided.

The problem of delivering up the skin may also be solved by providing the skin entraining roller 2 with radial grooves, in which lifting rollers arranged with star-shaped blades penetrating into the radial grooves engage in place of the brush roller 14. Here also, a scraping comb which reaches between the blades ensures that the skin is removed from the lifing roller.

For processing larger body parts, for example breast caps or front halves, the webs 21 or 22 may be provided with interrupting grooves 28 or nicks to aid the swift processing of such larger pieces.

We claim:

1. An apparatus for removing the skin from the bodies or body parts of slaughtered poultry, comprising
   a) rotationally driven skin entraining means defining a direction and an axis of rotation and having a non-skid or gripping outer surface,
   b) knife means defining a cutting edge, said cutting edge being arranged to opposed said outer surface and being spaced from the same by a gap,
   c) pressing means arranged downstream of said cutting edge with respect to the rotation direction of the skin entraining means and having a pressing surface facing said outer surface and being spaced from the same by a gap, and
   d) auxiliary conveying means arranged above said knife means and being resiliently displaceable away from said knife means under spring force or gravity, wherein said auxiliary conveying means further comprises at least one rotationally driven rotary member, which has an axis of rotation running essentially parallel to the axis of the skin entraining means and defines a circumference around which is disposed a helical web.

2. An apparatus as claimed in claim 1, wherein said web forms an outer envelope on said rotary member upon rotation of the latter, said outer envelope having a cylindrical form.

3. An apparatus as claimed in claim 1, wherein said web forms an outer envelope on said rotary member, upon rotation of the latter, said outer envelope having the form of a truncated cone.

4. An apparatus as claimed in claim 1, wherein at least one of the pitch and the height of said helical web is smaller that the largest width dimension and the largest height dimension, respectively, of the poultry body or body part to be processed.

5. An apparatus as claimed in claim 2, wherein at least one of the pitch and the height of said helical web is smaller that the largest width dimension and the largest height dimension, respectively, of the poultry body or body part to be processed.

6. An apparatus as claimed in claim 3, wherein at least one of the pitch and the height of said helical web is smaller that the largest width dimension and the largest height dimension, respectively, of the poultry body or body part to be processed.

7. An apparatus as claimed in claim 4, wherein said auxiliary conveying means comprise two rotary members having outer regions, each said rotary member being arranged to be resiliently yielding and being provided with one said helical web, each said web being arranged such that, on rotation of the respective rotary member, the web generates a component of force towards the other rotary member, respectively, and thereby forms a discharge end.

8. An apparatus as claimed claim 1, wherein said web comprises outer edges, said outer edges being interrupted by grooves.

9. An apparatus as claimed claim 5, wherein said web comprises outer edges, said outer edges being interrupted by grooves.

10. An apparatus as claimed claim 6, wherein said web comprises outer edges, said outer edges being interrupted by grooves.

11. An apparatus as claimed in claim 7, wherein said helical web terminates at its discharge end with a web portion which extends radially outwards from the axis of the rotary member and in parallel therewith.

12. An apparatus as claimed in claim 11, wherein there is further provided a feed device comprising at least one driven conveyor belt, which is deflected in the immediate vicinity of said outer surface and defines a conveying surface, guide rails being associated with said conveying surface and being arranged in pairs to form guide channels which lead towards the outer regions of respective rotary members, the guide rails in each pair being adjustable with respect to their mutual spacing.

13. An apparatus as claimed in claim 12, wherein said guide rails are additionally arranged to be adjustable in their longitudinal direction.

14. An apparatus for removing the skin from the bodies or body parts of slaughtered poultry, comprising
 a) rotationally driven skin entraining means defining a direction and an axis of rotation and having a non-skid or gripping outer surface,
 b) knife means defining a cutting edge, said cutting edge being in spaced relation with said outer surface,
 c) pressing means arranged downstream of said cutting edge with respect to the rotation direction of the skin entraining means and having a pressing surface facing said outer surface and being spaced from the same by a gap, and
 d) two coaxially arranged rotary members disposed above said knife means and being arranged to be resiliently yielding, each said rotary members being provided with a helical web around its circumference, whereby on rotation of the respective rotary member, the web generates a component of force towards the other rotary member, respectively, and thereby forms a discharge end.

15. An apparatus as claimed in claim 14, wherein each said helical web terminates at its discharge end with a web portion which extends radially outwards from the axis of the rotary members and in parallel therewith.

16. An apparatus as claimed in claim 14, wherein said web comprises outer edges, said outer edges being interrupted by grooves.

17. An apparatus as claimed in claim 14, wherein there is further provided a feed device comprising at least one driven conveyor belt, which is deflected in the immediate vicinity of said outer surface and defines a conveying surface, guide rails being associated with said conveying surface and being arranged in pairs to form guide channels which lead towards the outer regions of respective rotary members, the guide rails in each pair being adjustable with respect to their mutual spacing.

18. An apparatus as claimed in claim 17, wherein said guide rails are additionally arranged to be adjustable in their longitudinal direction.

19. An apparatus as claimed in claim 15, wherein there is further provided a feed device comprising at least one driven conveyor belt, which is deflected in the immediate vicinity of said outer surface and defines a conveying surface, guide rails being associated with said conveying surface and being arranged in pairs to form guide channels which lead towards the outer regions of respective rotary members, the guide rails in each pair being adjustable with respect to their mutual spacing.

20. An apparatus as claimed in claim 19, wherein said guide rails are additionally arranged to be adjustable in their longitudinal direction.

21. An apparatus as claimed in claim 20, wherein at least one of the pitch and the height of said helical web is smaller that the largest width dimension and the largest height dimension, respectively, of the poultry body or body part to be processed.

22. An apparatus as claimed in claim 21, wherein each said helical web terminates at its discharge end with a web portion which extends radially outwards from the axis of the rotary members and in parallel therewith.

23. An apparatus as claimed in claim 22, wherein said web forms an outer envelope on said rotary member upon rotation of the latter, said outer envelope having a cylindrical form.

24. An apparatus as claimed in claim 22, wherein said web forms an outer envelope on said rotary member, upon rotation of the latter, said outer envelope having the form of a truncated cone.

25. An apparatus as claimed in claim 16, wherein said web forms an outer envelope on said rotary member upon rotation of the latter, said outer envelope having a cylindrical form.

26. An apparatus as claimed in claim 16, wherein said web forms an outer envelope on said rotary member, upon rotation of the latter, said outer envelope having the form of a truncated cone.

27. An apparatus as claimed in claim 16, wherein at least one of the pitch and the height of said helical web is smaller that the largest width dimension and the largest height dimension, respectively, of the poultry body or body part to be processed.

* * * * *